(No Model.)
G. M. SEBASTIAN.
PLOWSHARE TONGS.
No. 303,460. Patented Aug. 12, 1884.
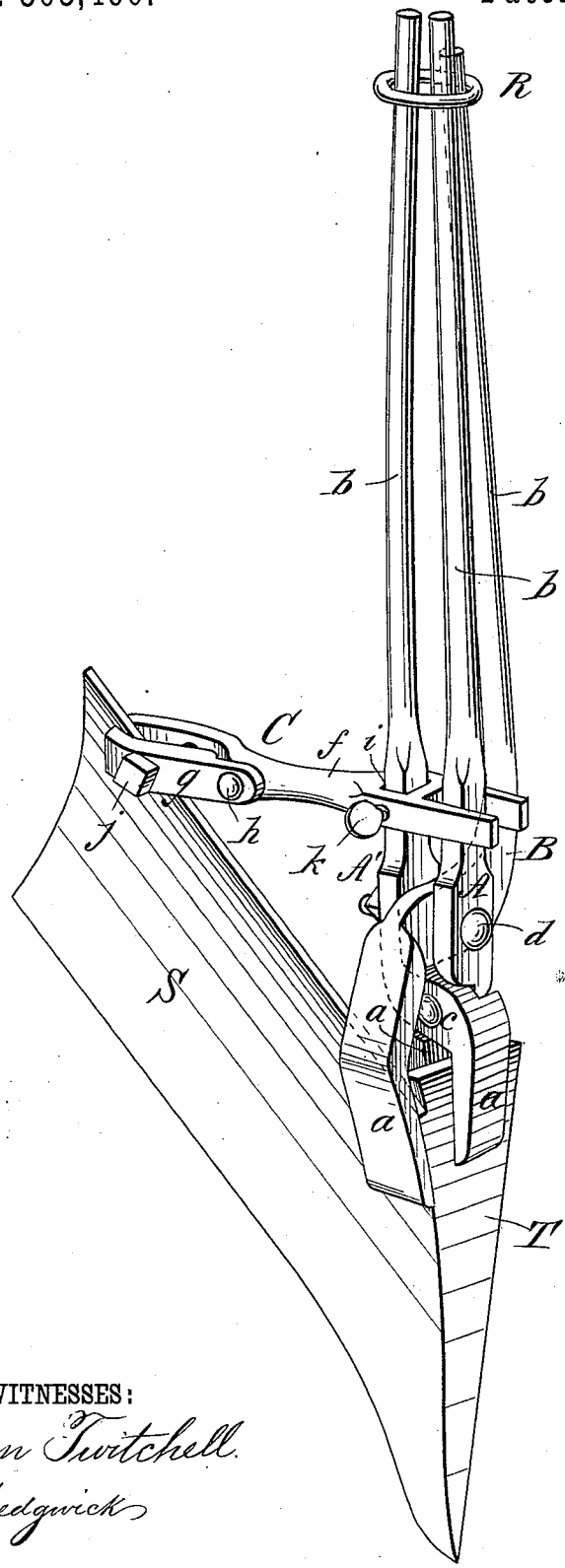
WITNESSES:
Donn Twitchell.
C. Sedgwick
INVENTOR:
G. M. Sebastian
BY Munn &Co
ATTORNEYS.

UNITED STATES PATENT OFFICE.

GEORGE M. SEBASTIAN, OF ARKANSAS CITY, KANSAS.

PLOWSHARE-TONGS.

SPECIFICATION forming part of Letters Patent No. 303,460, dated August 12, 1884.

Application filed April 24, 1884. (No model.)

*To all whom it may concern:*

Be it known that I, GEORGE M. SEBASTIAN, of Arkansas City, in the county of Cowley and State of Kansas, have invented a new and Improved Plow-Share Tongs, of which the following is a full, clear, and exact description.

This invention has for its object to provide a convenient tool to be used in welding the bars to plowshares; and to this end the invention consists, principally, of tongs having three jaws and handles arranged to grasp both the plowshare and the bar, holding the edges thereof to be welded together in close contact with each other, so that a true and perfect weld may always be effected.

The invention also consists of a brace-clamp to be used in connection with the tongs.

Reference is to be had to the accompanying drawing, forming part of this specification, in which the figure is a perspective view of my invention as it appears when applied to a plowshare and bar for use.

In making my new tongs I employ the members A, A', and B, each being formed with the jaw portion $a$ and handle portion $b$. The members A A' are cross-pivoted at $c$, like a pair of ordinary blacksmith's tongs. The member B is pivoted between the members A A' upon the bolt $d$, so that its jaw portion $a$, in grasping an object—the plowshare S, for example—acts against the edges of the jaws of the members A A', as clearly illustrated in the drawing.

C is the brace. This is formed of the main portion $f$, which is adapted to be attached to the handle portion of one of the members A A', and of the clamp $g$, which is pivoted at $h$ to the main portion $f$, and is adapted to be clamped upon the plowshare S by the bolt $j$, which passes through the clamp $g$ and enters a screw-tap made in the main portion $f$, as will be understood from the drawing. By preference, for attaching the brace C to the handle of one of the members of the tongs, I form the main portion $f$ with the passage $i$, through which one of the handles is adapted to be passed, as shown, and I provide the set-screw $k$ for locking the brace to the handle.

In use the bar T will be placed against the plowshare S and grasped by the jaws of the members A A' of the tool, while the plowshare S will be grasped by the member B, so as to hold the bar T at right angles to and at the edge of the plowshare S. Then the handle portions of the jaws will be drawn together and held by the ring R. The brace C will then be clamped to the upper edge of the plowshare S, as shown, which causes the plowshare S and bar T to be held as in a vise, so that they may be welded together with comparative convenience and ease, always enabling the workman to make a good and reliable weld.

These tongs will be found useful in holding a share in sharpening, and can be used as an ordinary pair of tongs.

Having thus described my invention, I claim as new and desire to secure by Letters Patent—

1. The tongs herein shown and described, composed of three members pivoted together, substantially as and for the purposes set forth.

2. The combination, with the members of the tongs, of the brace-clamp C, adapted to be attached to the tongs and to the object held in the tongs, substantially as described.

GEORGE M. SEBASTIAN.

Witnesses:
A. J. CHAPEL,
J. A. LOOMIS.